(12) United States Patent
Miyake et al.

(10) Patent No.: US 7,292,761 B2
(45) Date of Patent: Nov. 6, 2007

(54) OPTICAL TRANSMISSION DEVICE

(75) Inventors: Kazuyuki Miyake, Hyogo (JP);
Syunichiro Yamaguchi, Hyogo (JP);
Tetsuya Yamamoto, Hyogo (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 0 days.

(21) Appl. No.: 10/553,842

(22) PCT Filed: Apr. 16, 2004

(86) PCT No.: PCT/JP2004/005526

§ 371 (c)(1),
(2), (4) Date: Aug. 3, 2006

(87) PCT Pub. No.: WO2004/097471

PCT Pub. Date: Nov. 11, 2004

(65) Prior Publication Data

US 2007/0041689 A1    Feb. 22, 2007

(30) Foreign Application Priority Data

Apr. 25, 2003    (JP)    ................ 2003-122532

(51) Int. Cl.
*G02B 6/032*    (2006.01)
*G02B 6/26*    (2006.01)

(52) U.S. Cl. .................................. 385/125; 385/39

(58) Field of Classification Search ........... 385/39, 385/85, 98, 125
See application file for complete search history.

(56) References Cited

U.S. PATENT DOCUMENTS

2002/0159734 A1* 10/2002 Sasaoka et al. ............. 385/125

FOREIGN PATENT DOCUMENTS

| JP | 5-288967 | 11/1993 |
|----|----------|---------|
| JP | 05288967 A * | 11/1993 |
| JP | 8-220378 | 8/1996 |
| JP | 08220378 A * | 8/1996 |
| JP | 2002-323625 | 11/2002 |
| JP | 2002323625 A * | 11/2002 |

OTHER PUBLICATIONS

Raw Machine English Translation of JP 05288967 A, Printed on May 8, 2007.*
Raw Machine English Translation of JP 08220378 A, Printed on May 8, 2007.*
International Search Report with mail date Jun. 1, 2004 Application No. PCT/JP2004/005526.

* cited by examiner

*Primary Examiner*—Quyen P Leung
(74) *Attorney, Agent, or Firm*—Nixon Peabody LLP; Donald R. Studebaker

(57) ABSTRACT

A connection end portion of a PC fiber 10 is fused by heating to provide a sealing portion 15 which seals holes 12a of a cladding 12. Length L of the sealing portion 15 is determined by calculation based on the conditions such as an incident angle θ [°] of signal light 22 with respect to the PC fiber 10, an outer diameter D [μm] of the fiber, a diameter a [μm] of the core of the fiber and a refractive index n of the sealing portion 15.

2 Claims, 2 Drawing Sheets

OPTICAL TRANSMISSION DEVICE

TECHNICAL FIELD

The present invention relates to an optical transmission device.

BACKGROUND ART

Photonic crystal fibers (hereinafter referred to as PC fibers) have been known as an optical fiber which exhibits strong wavelength dispersion. The PC fiber includes a solid or hollow core which extends the center of the fiber in the longitudinal direction of the fiber and a cladding which surrounds the core and has a plurality of holes extending along the core. The cladding provides a photonic crystal structure which brings periodic changes in refractive index.

If the hollow core and the holes of the cladding of the PC fiber are left opened at an end face of the PC fiber, foreign objects may possibly come into the hollow core and the holes of the cladding, thereby impairing the optical properties. From this aspect, Japanese Unexamined Patent Publication No. 2002-323625 discloses a PC fiber whose end face has been fused to seal the hollow core and the holes of the cladding.

However, when the end face of the PC fiber is fused to seal the hollow core and the holes of the cladding, the length of the sealing portion of the fiber will be as long as about 1 mm. As a result, when signal light is transmitted directly to the fiber from a condenser or a light source, the signal light leaks out of the fiber to cause a problem of great connection loss.

Further, Japanese Unexamined Patent Publication No. 2002-323625 discloses that the length of the sealing portion should be determined such that almost no influence is caused on optical waveguiding. However, the Publication is unclear because of lack of specific descriptions of the length. Since the length of the sealing portion varies depending on the type of the fiber, it is necessary to determine the length of the sealing portion by repeating examinations of the connection loss on each fiber. As a result, working efficiency deteriorates and the resulting products vary in quality.

DISCLOSURE OF THE INVENTION

An object of the present invention is to provide an optical transmission device using a PC fiber which achieves connection with a reduced connection loss.

According to the present invention, a connection end portion of the PC fiber is treated such that the holes of the cladding are sealed. At this time, the length of the portion of the PC fiber at which the holes of the cladding are sealed by the sealing treatment is determined based on conditions such as a fiber diameter and an incident angle of signal light, thereby realizing an optical transmission device which achieves connection with a reduced connection loss.

Specifically, the present invention provides an optical transmission device including: a condenser which gathers signal light; and a PC fiber which is connected to the condenser and includes a solid core which constitutes the center of the fiber and a cladding which surrounds the core and has a plurality of holes extending along the core for transmitting the signal light from the condenser through the core, wherein the holes of the cladding are sealed at an end portion of the PC fiber connected to the condenser over a predetermined length L from an end face of the fiber and the length L [μm] of the portion of the PC fiber at which the holes of the cladding are sealed is determined to meet the condition of $$10 \leq L \leq (D+a)/2 \, \tan[\sin^{-1}(\sin \theta/n)]$$

wherein θ [°] is an incident angle of the signal light with respect to the PC fiber, D [μm] is an outer diameter of the PC fiber, a [μm] is a diameter of the core of the PC fiber and n is a refractive index of the portion of the PC fiber at which the holes of the cladding are sealed.

According to the present invention, the connection end portion of the PC fiber is treated such that the holes of the cladding are sealed and the length of the portion of the PC fiber at which the holes of the cladding are sealed is determined to meet the above-described condition. Therefore, even when the signal light gathered by the condenser is directly transmitted to the fiber, the signal light does not leak out of the fiber. As a result, optical transmission is achieved with efficiency without causing a connection loss.

According to another aspect of the present invention, there is provided an optical transmission device including: a light source which emits signal light; and a PC fiber which is connected to the light source and includes a solid core which constitutes the center of the fiber and a cladding which surrounds the core and has a plurality of holes extending along the core for transmitting the signal light from the light source through the core, wherein the holes of the cladding are sealed at an end portion of the PC fiber connected to the light source and the length L [μm] of the portion of the PC fiber at which the holes of the cladding are sealed is determined to meet the condition of $$10 \leq L \leq (a/2 - d \cdot \tan \theta)/\tan[\sin^{-1}(\sin \theta/n)]$$

wherein θ [°] is an incident angle of the signal light from the light source with respect to the PC fiber, d [μm] is a distance between the light source and the end face of the fiber, a [μm] is a diameter of the core of the PC fiber and n is a refractive index of the portion of the PC fiber at which the holes after the cladding are sealed.

According to the another aspect of the present invention, the connection end portion of the PC fiber is treated such that the holes of the cladding are sealed and the length of the portion of the PC fiber at which the holes of the cladding are sealed is determined to meet the above-described condition. Therefore, even when the signal light output from the light source is directly transmitted into the fiber, the signal light does not leak out of the fiber. As a result, optical transmission is achieved with efficiency without causing a connection loss.

BEST MODE FOR CARRYING OUT THE INVENTION

Hereinafter, with reference to the drawings, optical transmission devices according to preferred embodiments of the present invention will be explained in detail.

EMBODIMENT 1

[Structures of Fiber and Optical Transmission Device]

Figure 1:
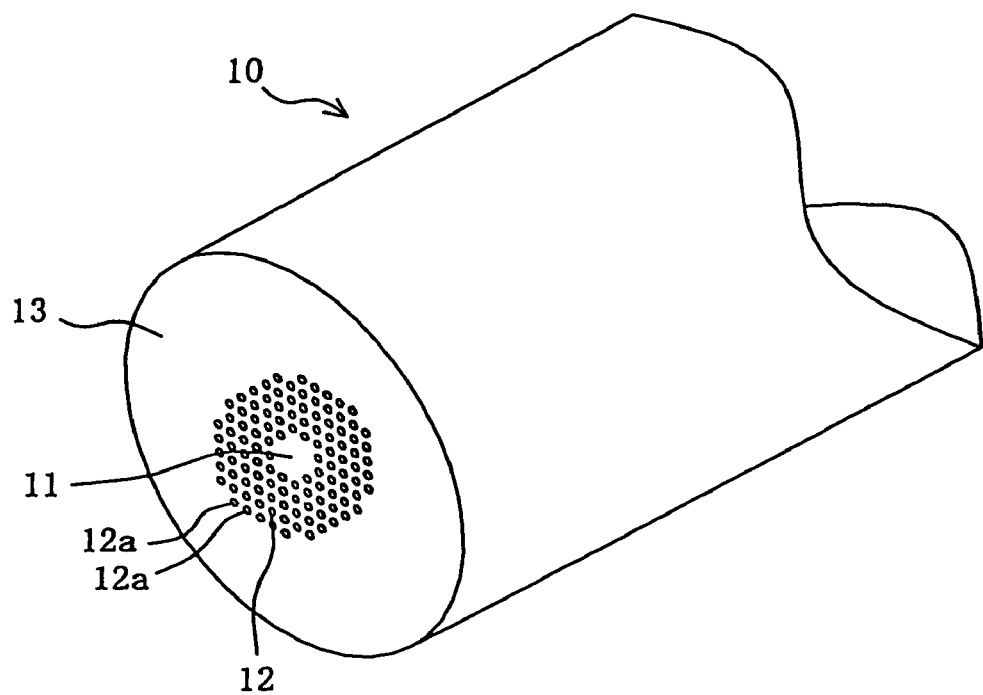
FIG. 1 is an oblique view illustrating a PC fiber according to Embodiments 1 and 2 of the present invention.

FIG. 1 shows a PC fiber 10.

The PC fiber 10 includes a solid core 11 which extends the center of the fiber in the longitudinal direction of the fiber and a cladding 12 which surrounds the core 11 and has a plurality of holes 12a extends along the core 11 and a covering 13 which covers the cladding 12. The cladding 12 has a photonic crystal structure which brings two-dimensional periodic changes in refractive index. Signal light (not shown) is confined in the core 11 surrounded by the photonic crystal structure to be transmitted therethrough.

Figure 2:
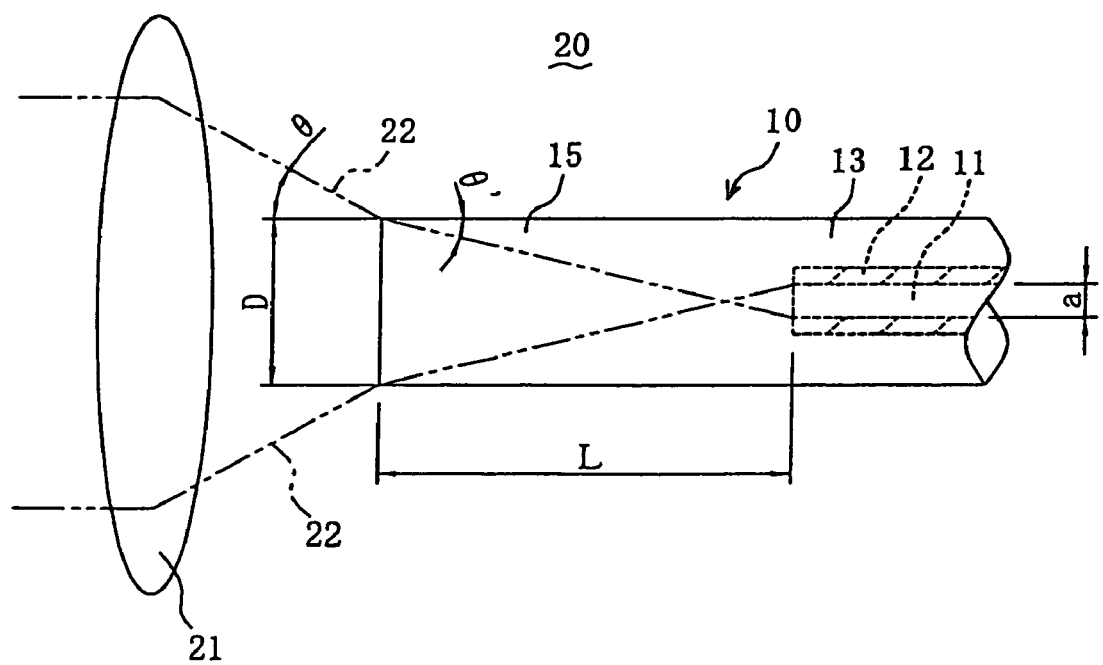
FIG. 2 is a schematic view illustrating an optical transmission device according to Embodiment 1 of the present invention.

A connection end portion of the PC fiber 10 is fused by heating to seal the holes 12a of the cladding 12. At this time, the connection end portion of the PC fiber 10 including the core 11, cladding 12 and covering 13 becomes a sealing portion 15 including the cladding 12 with the holes 12a sealed and the covering 13 as shown in FIG. 2. The sealing portion 15 may be provided by fixing a glass stick to the connection end of the PC fiber 10 or filling portions of the holes 12a with a resin.

The connection end portion of the PC fiber 10 at which the holes 12a have been sealed is connected to a condenser 21 which gathers signal light 22. Thus, an optical transmission device 20 which transmits the signal light 22 gathered by the condenser 21 through the PC fiber 10 is provided.

[Condition for Determining Length L of the Sealing Portion 15]

Hereinafter, a condition for determining the length L of the sealing portion 15 along the longitudinal direction of the fiber is explained.

First, an incident angle of the signal light 22 with respect to the PC fiber 10 in the atmosphere is defined as θ [°], an incident angle of the signal light 22 entering the PC fiber 10 is θ' [°], an outer diameter of the PC fiber 10 is D [μm], a diameter of the core of the PC fiber 10 is a [μm], a refractive index of light in the atmosphere is n', a refractive index of the sealing portion 15 is n and the length of the sealing portion 15 along the longitudinal direction of the fiber is L [μm]. The length L of the sealing portion 15 is the length of a portion of the PC fiber 10 at which the holes 12a of the cladding 12 are sealed and measured from the connection end of the PC fiber 10. As long as at least one of the holes 12a has been sealed, a portion of the PC fiber corresponding to the sealed holes is considered as the sealing portion 15.

The signal light 22 gathered by the condenser 21 travels in the atmosphere toward the PC fiber 10 at the incident angle θ and then travels in the sealing portion 15 of the PC fiber 10 at the incident angle θ'. Therefore, the following equation (1) is established.

$$n' \cdot \sin\theta = n \cdot \sin\theta' \qquad (1)$$

Since n' is the refractive index of light in the atmosphere, n'=1 is given. As a result, the incident angle θ' of the signal light 22 in the sealing portion 15 is represented by the equation (2).

$$\theta' = \sin^{-1}(\sin\theta/n) \qquad (2)$$

In the sealing portion 15 of the PC fiber 10, the signal light 22 travels by the length L in the longitudinal direction of the PC fiber 10 while it travels by (D+a)/2 in the direction of the diameter of the PC fiber 10. Therefore, the following equation (3) is established.

$$\tan\theta' = [(D+a)/2]/L \qquad (3)$$

From the equations (2) and (3), the length L of the sealing portion 15 in the longitudinal direction of the fiber is represented by the equation (4).

$$L = (D+a)/2 \, \tan[\sin^{-1}(\sin\theta/n)] \qquad (4)$$

Accordingly, the maximum value of L is defined as a length which is required for the incident light to converge to a point and then spread to the size of the core diameter.

As a result of a trial and error process by the inventors of the present invention in order to find a suitable length L which makes it possible to seal the holes 12a of the cladding 12 with high reproducibility, the lower limit of the length L of the sealing portion 15 is preferably set to about 10 μm.

Therefore, from the equation (4), it is necessary to meet the condition of the following equation (5) in order that the signal light 22 output from the condenser 21 and entered the PC fiber 10 passes through the sealing portion 15 and surely reaches the holes 12a of the cladding 12 to cause total reflection.

$$10 \leq L \leq (D+a)/2 \, \tan[\sin^{-1}(\sin\theta/n)] \qquad (5)$$

Thus, as long as the length L of the sealing portion 15 is determined within the range that meets the condition of the equation (5), optical transmission is carried out with efficiency without a connection loss resulting from leakage of the signal light 22 out of the PC fiber 10.

EMBODIMENT 2

[Structures of Fiber and Optical Transmission Device]

Figure 3:
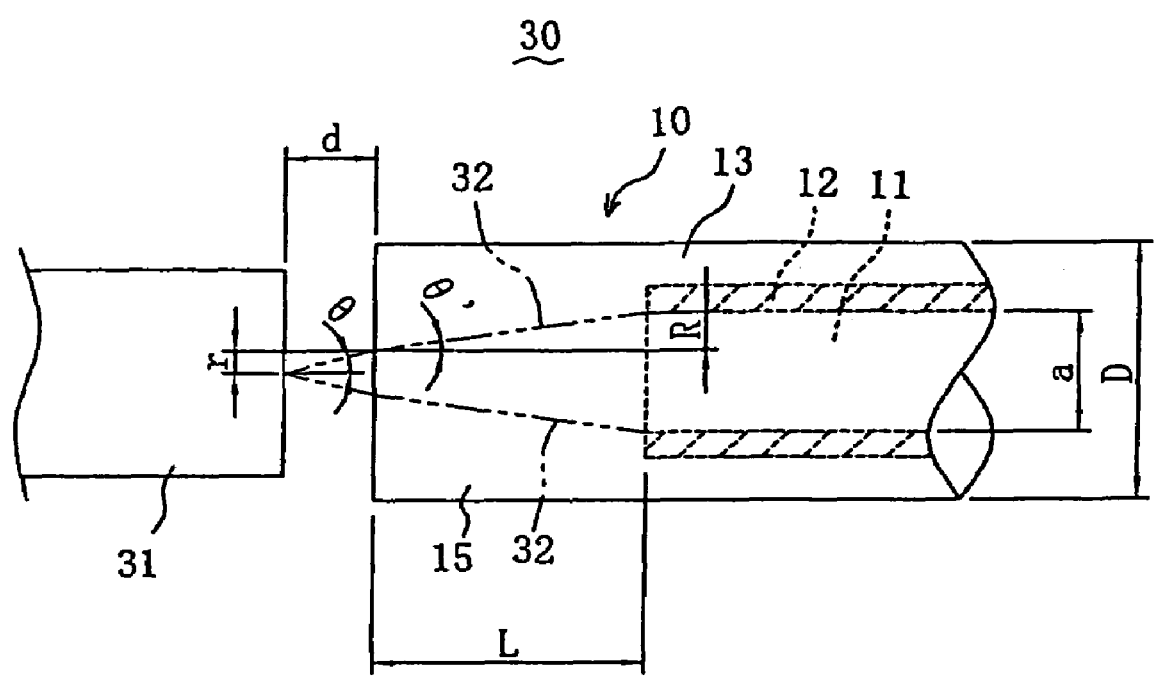
FIG. 3 is a schematic view illustrating an optical transmission device according to Embodiment 2 of the present invention.

FIG. 3 shows an optical transmission device 30 according to Embodiment 2.

The optical transmission device 30 includes a PC fiber 10 which is the same as that of Embodiment 1. The structure of the sealing portion 15 of the PC fiber 10 is also the same as described in Embodiment 1.

The connection end portion of the PC fiber 10 at which the holes 12a have been sealed is connected to a semiconductor laser (light source) 31. Thus, the optical transmission device 30 which transmits signal light 32 output from the semiconductor laser 31 through the PC fiber 10 is provided.

[Condition for Determining Length L of the Sealing Portion 15]

Hereinafter, a condition for determining the length L of the sealing portion 15 along the longitudinal direction of the fiber is explained.

First, an incident angle of the signal light 32 with respect to the PC fiber 10 in the atmosphere is defined as θ [°], an incident angle of the signal light 32 entering the PC fiber 10 is θ' [°], an outer diameter of the PC fiber 10 is D [μm], a diameter of the core of the PC fiber 10 is a [μm], a refractive index of light in the atmosphere is n', a refractive index of the sealing portion 15 is n, the distance between the semiconductor laser 31 and an end face of the fiber is d [μm], a radius of the signal light 32 spreading toward the fiber circumference at the end face of the PC fiber 10 is r [μm], a radius of the signal light 32 spreading toward the fiber circumference at the interface between the sealing portion 15 and the core 11 of the PC fiber 10 is R [μm] and the length of the sealing portion 15 along the longitudinal direction of the fiber 10 is L [μm]. The length L of the sealing portion 15 is the length of a portion of the PC fiber 10 at which the holes 12a of the cladding 12 are sealed and measured from the connection end of the PC fiber 10. As long as at least one of the holes 12a has been sealed, a portion of the PC fiber corresponding to the sealed hole is considered as the sealing portion 15.

The signal light 32 output from the semiconductor laser 31 is emitted in the atmosphere with respect to the end face of the PC fiber 10 at the incident angle θ, travels by the distance d between the semiconductor laser 31 and the end face of the fiber, and then goes through the sealing portion 15 of the PC fiber 10 at the incident angle θ'. Therefore, the following equation (6) is established.

$$n' \cdot \sin\theta = n \cdot \sin\theta' \quad (6)$$

Since n' is the refractive index of light in the atmosphere, n'=1 is given. As a result, the incident angle θ' of the signal light 22 in the sealing portion 15 is represented by the equation (7).

$$\theta' = \sin^{-1}(\sin\theta/n) \quad (7)$$

The radius r of the signal light 32 spreading toward the fiber circumference at the end face of the PC fiber 10 is represented by the equation (8).

$$r = d \cdot \tan\theta \quad (8)$$

Further, the signal light 32 travels by the length L of the sealing portion 15 at the incident angle θ'. The radius R of the signal light 32 spreading toward the fiber circumference at the interface between the sealing portion 15 and the core 11 of the PC fiber 10 is represented by the equation (9).

$$R = L \cdot \tan\theta' \quad (9)$$

Since the sum of the radii r and R is equal to a half of the core diameter a, the equation (10) is established.

$$r + R = a/2 \quad (10)$$

When the equation (10) is represented by the length L of the sealing portion 15 using the equations (7) to (9), the following equation (11) is obtained.

$$L = (a/2 - d \cdot \tan\theta)/\tan[\sin^{-1}(\sin\theta/n)] \quad (11)$$

As a result of a trial and error process by the inventors of the present invention in order to find a suitable length L which makes it possible to seal the holes 12a of the cladding 12 with high reproducibility, the lower limit of the length L of the sealing portion 15 is preferably set to about 10 μm.

Therefore, from the equation (11), it is necessary to meet the condition of the following equation (12) in order that the signal light 32 output from the semiconductor laser 31 and entered the PC fiber 10 passes through the sealing portion 15 and surely reaches the holes 12a of the cladding 12 to cause total reflection.

$$10 \leq L \leq (a/2 - d \cdot \tan\theta)/\tan[\sin^{-1}(\sin\theta/n)] \quad (12)$$

Thus, as long as the length L of the sealing-portion 15 is determined within the range that meets the condition of the equation (12), optical transmission is carried out with efficiency without a connection loss resulting from leakage of the signal light 32 out of the PC fiber 10.

INDUSTRIAL APPLICABILITY

The present invention is useful for optical transmission devices.

The invention claimed is:

1. An optical transmission device comprising:
   a condenser which gathers signal light; and
   a photonic crystal fiber which is connected to the condenser and includes a solid core which constitutes the center of the fiber and a cladding which surrounds the core and has a plurality of holes for transmitting the signal light from the condenser through the core, wherein
   the holes of the cladding are sealed at an end portion of the photonic crystal fiber connected to the condenser over a predetermined length L from an end face of the fiber and
   the length L [μm] of the portion of the photonic crystal fiber at which the holes of the cladding are sealed is determined to meet the condition of $$10 \leq L \leq (D+a)/2 \, \tan[\sin^{-1}(\sin\theta/n)]$$

wherein θ [°] is an incident angle of the signal light with respect to the photonic crystal fiber, D [μm] is an outer diameter of the photonic crystal fiber, a [μm] is a diameter of the core of the photonic crystal fiber and n is a refractive index of the portion of the photonic crystal fiber at which the holes of the cladding are sealed.

2. An optical transmission device comprising:
   a light source which emits signal light; and
   a photonic crystal fiber which is connected to the light source and includes a solid core which constitutes the center of the fiber and a cladding which surrounds the core and has a plurality of holes for transmitting the signal light from the light source through the core, wherein
   the holes of the cladding are sealed at an end portion of the photonic crystal fiber connected to the light source and
   the length L [μm] of the portion of the photonic crystal fiber at which the holes of the cladding are sealed is determined to meet the condition of $$10 \leq L \leq (a/2 - d \cdot \tan\theta)/\tan[\sin^{-1}(\sin\theta/n)]$$

wherein θ [°] is an incident angle of the signal light from the light source with respect to the photonic crystal fiber, d [μm] is a distance between the light source and the end face of the fiber, a [μm] is a diameter of the core of the photonic crystal fiber and n is a refractive index of the portion of the photonic crystal fiber at which the holes after the cladding are sealed.

* * * * *